US006813969B2

(12) United States Patent
Huang

(10) Patent No.: US 6,813,969 B2
(45) Date of Patent: Nov. 9, 2004

(54) ROCKER RETURN LINER FOR BALL NUT

(75) Inventor: Charles C. Huang, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 63 days.

(21) Appl. No.: 10/186,491

(22) Filed: Jul. 1, 2002

(65) Prior Publication Data

US 2004/0000207 A1 Jan. 1, 2004

(51) Int. Cl.[7] ............................................. F16H 25/22
(52) U.S. Cl. .............................. 74/424.83; 74/424.86
(58) Field of Search .......................... 74/424.86, 424.87, 74/424.83, 424.84, 424.82

(56) References Cited

U.S. PATENT DOCUMENTS

| 3,009,367 A | 11/1961 | Stiggow .................... 74/459 |
| 3,261,224 A | 7/1966 | Anthony .................... 74/459 |
| 3,371,551 A | 3/1968 | Profet ...................... 74/424.8 |
| 3,393,575 A | 7/1968 | Irwin ....................... 74/424.8 |
| 3,667,311 A | 6/1972 | Wysong .................. 74/424.8 R |
| 3,673,886 A | 7/1972 | Tomita et al. ............ 74/424.8 R |
| 4,070,921 A | 1/1978 | Arnold ...................... 74/459 |
| 4,612,817 A | 9/1986 | Neff .................... 74/424.8 NA |
| 4,680,982 A | 7/1987 | Wilke et al. ............ 74/424.8 R |
| 4,718,291 A | 1/1988 | Wood et al. ............... 74/89.15 |
| 4,841,796 A | 6/1989 | Teramachi ................... 74/459 |
| 4,945,781 A | 8/1990 | Isert ................... 74/424.8 A |
| 5,022,277 A | 6/1991 | Shaffer ................ 74/424.8 NA |
| 5,142,929 A | 9/1992 | Simpson, III ................ 74/459 |
| 5,193,409 A | 3/1993 | Babinski .................... 74/89.15 |
| 5,388,475 A | 2/1995 | Shear, III et al. ............. 74/459 |
| 5,622,082 A | 4/1997 | Machelski ................... 74/459 |
| 5,749,265 A | 5/1998 | Namimatsu et al. .......... 74/459 |
| 5,809,837 A | 9/1998 | Shaffer ................. 74/424.8 C |
| 6,089,117 A | 7/2000 | Ebina et al. .................. 74/459 |
| 6,499,369 B1 * | 12/2002 | Piotrowski et al. ......... 74/89.42 |
| 2002/0040614 A1 | 4/2002 | Grosspietsch et al. ... 74/424.75 |

FOREIGN PATENT DOCUMENTS

EP 0 257 249 * 3/1988

* cited by examiner

Primary Examiner—William C. Joyce
(74) Attorney, Agent, or Firm—Michael D. Smith

(57) ABSTRACT

A ball nut and return liner assembly includes a ball nut having a tubular body having a longitudinal axis, the tubular body having an inner surface and an outer surface, a plurality of arcuate grooves defined on the inner surface. A longitudinal slot is defined on the inner surface parallel to the longitudinal axis, interrupting the plurality of arcuate grooves, and forming a pocket for receiving the return liner, the longitudinal slot having first curved walls. The return liner is provided with a first surface having a plurality of S-shaped return grooves extending from the first side to the second side to cooperate with the plurality of arcuate grooves in the ball nut. The return liner is further provided with a second surface for fitting within the longitudinal slot within the ball nut, the second surface having second curved walls.

21 Claims, 3 Drawing Sheets

ROCKER RETURN LINER FOR BALL NUT

BACKGROUND OF THE INVENTION

This invention relates to ball nut assemblies, and, more particularly, this invention relates to a ball return liner within a ball nut that allows for slight adjustment within the ball nut.

Ball screw assemblies may be used to translate rotary motion to linear motion and linear motion to rotary motion. Most ball screw assemblies include an elongate ball screw, and a ball nut body. The ball nut body in cooperation with the ball screw direct a plurality of ball bearings through an internal bearing race formed between the ball nut body and ball screw upon rotation of the ball screw. The ball bearings translate rotary motion of the ball screw to linear motion of the ball nut body. Both the elongate ball screw and ball nut body commonly include a continuous helical groove which defines the internal bearing race.

The traditional ball nut return designs are featured in either fixed pockets or returned tubes without floating ability. For manufacturing such ball nut returns, substantial operations are required to produce the precise pockets or holes prior to and after heat treatment. Thus, manufacturing costs are high and work-in-process ("WIP") is significant, and the consistency of the quality is a continual concern.

Due to the very tight envelope nature design of the rack and ball nut assembly, there exists stringent requirements for the electric power steer ("EPS") product lash movement. The movement requires as little as .0125 mm in axial directions, which promotes a tremendous technical aspect for manufacturability during the high volume production. The match of rack thread form versus ball nut thread is becoming an unavoidable necessity and brings many more complications. In addition, more precise tolerances and expensive operations would be expected.

One example of a ball nut with ball return uses a deflector segment having rectangularly shaped corners which must be received in a longitudinal slot in a ball nut body. From a manufacturing perspective, care must be taken to ensure that the S-shaped return grooves in the deflector segment match up with the plurality of arcuate grooves within a sleeve segment when assembled since the cooperating deflector segment is fixed within the longitudinal slot. Misalignment of the arcuate grooves with the S-shaped return grooves in the deflector segment is compensated by utilizing a smaller ball bearing diameter, which may lead to a smaller load capacity limitation and shorter product life potential.

The manufacturing of ball nut return slots for a ball nut and return system can include a number of operations including heat treatment, "jig grinding", polishing and size inspection for part matching, however the highest cost driver of operations is jig grinding. The operation has been adapted either in the tool room or aerospace industries for limited production and selective operation. This is due to the nature of a slow machine cycle time and expensive capital investment.

The fixed pocket and hole return product design thus offers sophisticated manufacturing challenges in terms of the manufacturing cost, machining cycle time, quality consistency, component matching and WIP issues. In short, the current and traditional design is not cost effective and would not provide any significant competitive advantages that would penetrate the EPS market.

BRIEF SUMMARY OF THE INVENTION

The above discussed and other drawbacks and deficiencies are overcome or alleviated by a ball nut and return liner assembly including a ball nut having a tubular body having a longitudinal axis, the tubular body having an inner surface and an outer surface, a plurality of arcuate grooves defined on the inner surface. A longitudinal slot is defined on the inner surface parallel to the longitudinal axis, interrupting the plurality of arcuate grooves, and forming a pocket for receiving the return liner, the longitudinal slot having first curved walls. The return liner is provided with a first surface having a plurality of S-shaped return grooves extending from the first side to the second side to cooperate with the plurality of arcuate grooves in the ball nut. The return liner is further provided with a second surface for fitting within the longitudinal slot within the ball nut, the second surface having second curved walls.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several FIGS..

DETAILED DESCRIPTION OF THE INVENTION

Figure 1:
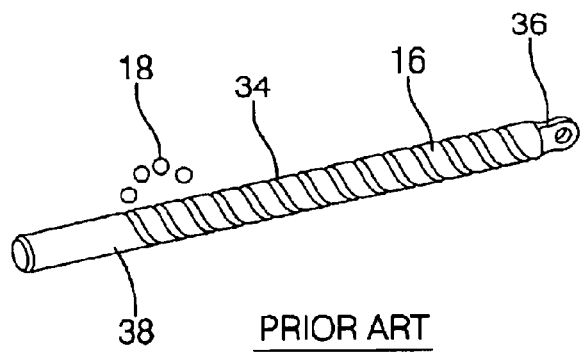
FIG. 1 is a perspective view of a prior art ball screw and balls.

Referring to FIG. 1, a prior art ball screw 16 and ball bearings 18 are shown. Ball screw 16 includes a continuous helical groove 34, which extends from a first end 36 of ball screw 16 to second end 38.

Figure 2:
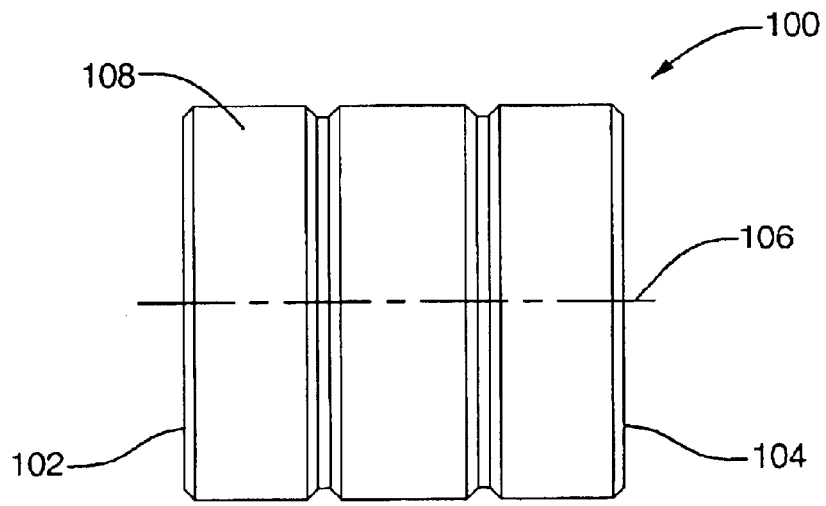
FIG. 2 is a side plan view of a ball nut.
Figure 3:
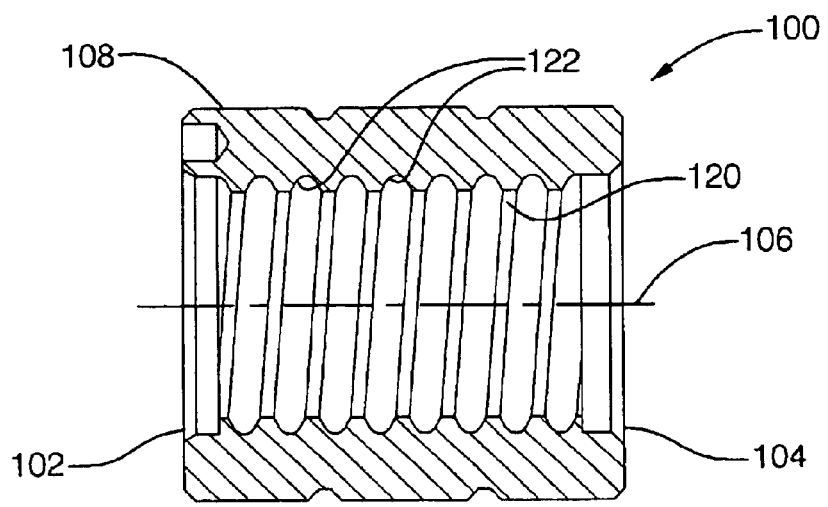
FIG. 3 is a side cross-sectional view of the ball nut of FIG. 2.

Turning now to FIG. 2, a ball nut 100 for receiving a ball screw such as ball screw 16 is shown. The ball nut 100 may be generally cylindrical and tubular, extends from a first end 102 to a second end 104, and has a longitudinal axis 106. The outer surface 108 is also shown. It should be understood that the outer surface 108 extends concentrically around the longitudinal axis 106. The interior of the ball nut 100 is shown in FIG. 3. The inner surface 120 is shown to include a plurality of arcuate grooves 122.

Figure 4:
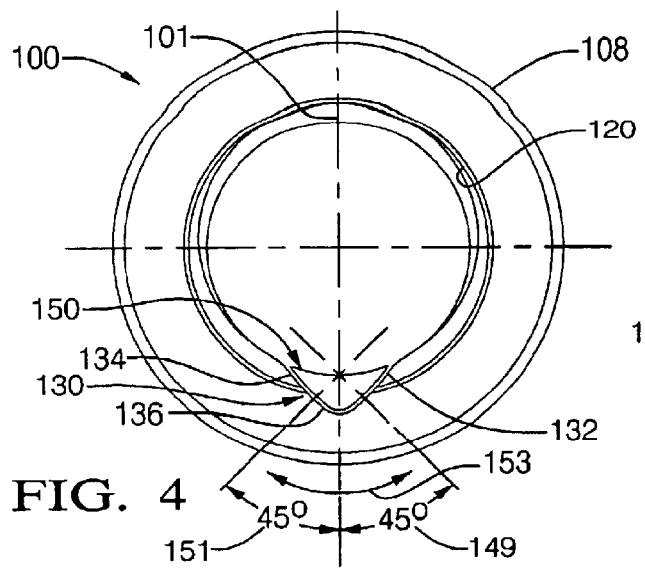
FIG. 4 is an end plan view of a ball nut housing a return liner.

Turning now to FIG. 4, an end view of the ball nut 100 reveals the longitudinal slot 130 that is formed within the inner surface 120. The longitudinal slot 130 preferably extends from the first end 102 to the second end 104, but may extend through a partial portion of the ball nut 100 for which ball return is desired. The longitudinal slot 130 intersects at least some, and in many cases all, of the arcuate grooves 122.

Figure 9:
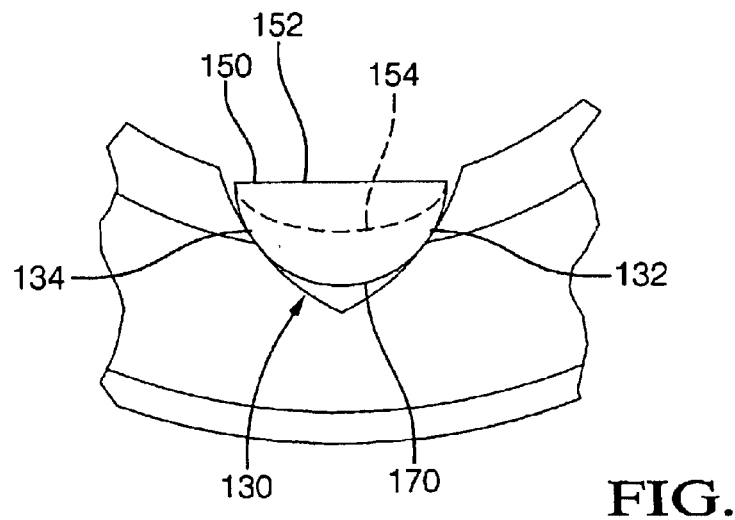

The longitudinal slot 130 includes a continuous wall 136 which may be referred to as walls e.g. 132, 134, which indicate a first wall half and a second wall half, which are arcuately shaped. That is, the wall 136 is absent the perpendicular corners. More particularly, the wall 136 may further be absent any angular corners. The longitudinal slot 130 may include a Gothic arch shape as shown in FIG. 9. A "Gothic" arch shape is generally the shape formed by the intersection of two circular arcs having equal radii of curvature and offset centers. The intersection of these arcs may be termed an apex. Thus, the Gothic arch has bilateral symmetry about a line that bisects the apex. The longitudinal slot 130 may instead include a semicircular shape where it is absent all planar walls and points or may include a combination of rounded corners and planar walls, where the planar walls are kept to a minimum for stress reduction, as will be detailed below.

Figure 5:
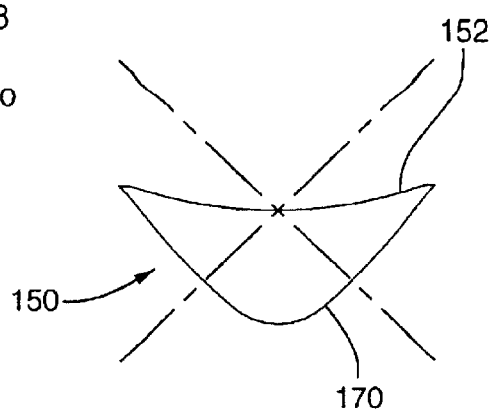
FIG. 5 is an end plan view of the return liner shown in FIG. 4.

As further shown in FIG. 4, and with reference to FIG. 5, a return liner 150 is positioned within the longitudinal slot 130. The return liner 150 may be slid into the longitudinal slot 130 at either end 102, 104 if the longitudinal slot 130 extends the full length of the ball nut 100 or may be inserted from above the longitudinal slot 130.

Figure 6:
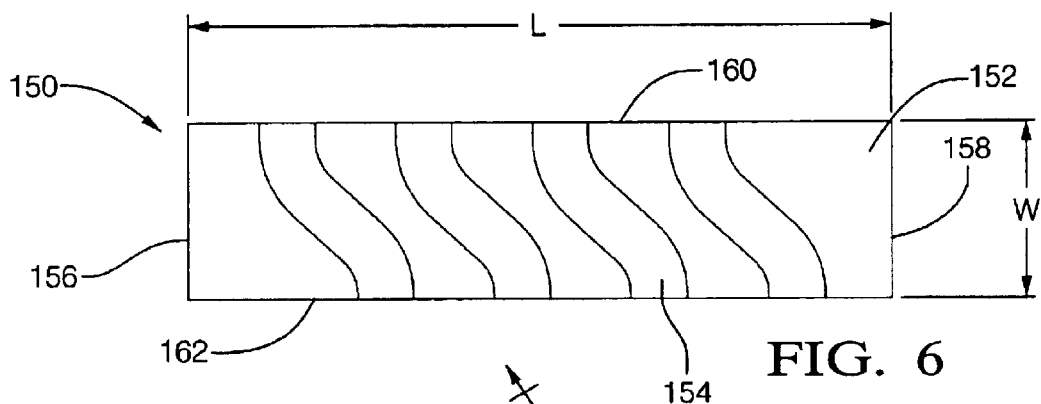
FIG. 6 is a top plan view of the return liner shown in FIG. 4.

Referring now to FIGS. 5 and 6, the return liner 150 includes a first surface 152 having a plurality of S-shaped return grooves 154. Four to six circuits, thus four to six grooves 154 are preferable to achieve the maximum efficiency due to dimensional stack-up. The return liner 150 includes a first end 156 and a second end 158, a length L measured from the first end 156 to the second end 158. The return liner 150 further includes a first side 160 and a second side 162, a width W measured from the first side 160 to the second side 162. The S-shaped return grooves extend from the first side 160 to the second side 162 and are distributed preferably evenly about the length L.

The return liner 150 further includes a second surface 170 which may be complimentarily shaped to fit within the longitudinal slot 130 of the ball nut 100, but need not be. The second surface 170 is also preferably curved, absent any perpendicular or other sharp angular curves and may further be absent any planar surfaces. A semicircular shape or other cross-sections including arcuate walls are preferably used, such as a gothic arch curvature which may also be used for defining the second surface 170. Thus, the return liner 150 includes a generally crescent-shaped cross-section. Furthermore, when the return liner 150 is in place within the longitudinal slot 130, the second surface 170 may be shaped such that the liner 150 only contacts the longitudinal slot 130, in cross-section, at two points. This is possible, for example, if the longitudinal slot 130 includes a gothic arch shape cross section and the second surface 170 includes a semicircular shape cross section or if the longitudinal slot 130 includes a semicircular shape cross section and if the liner 150 includes a gothic arch shape cross section. While in cross-section the liner 150 contacts the slot 130 at two points, it should be understood that the liner 150 would actually contact the slot 130 along two lines parallel to the longitudinal axis 106 of the ball nut 100. Preferably these two contact "points" would, in a rest position of the liner 150 within the slot 130, exist at a points defined by a line 101 dividing the longitudinal slot 130 and ball nut 100 in half. From the line 101, the points of contact preferably would exist at a distance of 45 degrees from line 101 as exemplified by angles 149 and 151. Within use, the liner 150 may have a limited degree of freedom of movement within the longitudinal slot 130 such that either angle 149 or 151 may increase or decrease, such as by five degrees.

When the return liner 150 is in place within the longitudinal slot 130 as shown in FIG. 4, the S-shaped return grooves 154 are spaced apart to cooperate with the plurality of arcuate grooves 122 such that translational movement of ball bearings is maintained by the S-shaped return grooves 154 returning the ball bearings to a preceding segment of an arcuate groove. Thus, the interruption of the arcuate grooves 122 by the longitudinal slot 130 is repaired when the return liner 150 is in place within the longitudinal slot 130. A ball screw, such as ball screw 16 is positioned within the ball nut 100 to translate rotary motion to linear motion, or linear motion to rotary motion. For example, in translating rotary motion to linear motion, ball screw 16 is rotated, thus translating motion to the plurality of ball bearings disposed within the ball nut assembly between the inner surface 120, the return liner 150, and the ball screw 16. The ball screw 16 and arcuate grooves 122 and return liner 150 provide an inner bearing race for the plurality of ball bearings to travel.

Figure 7:
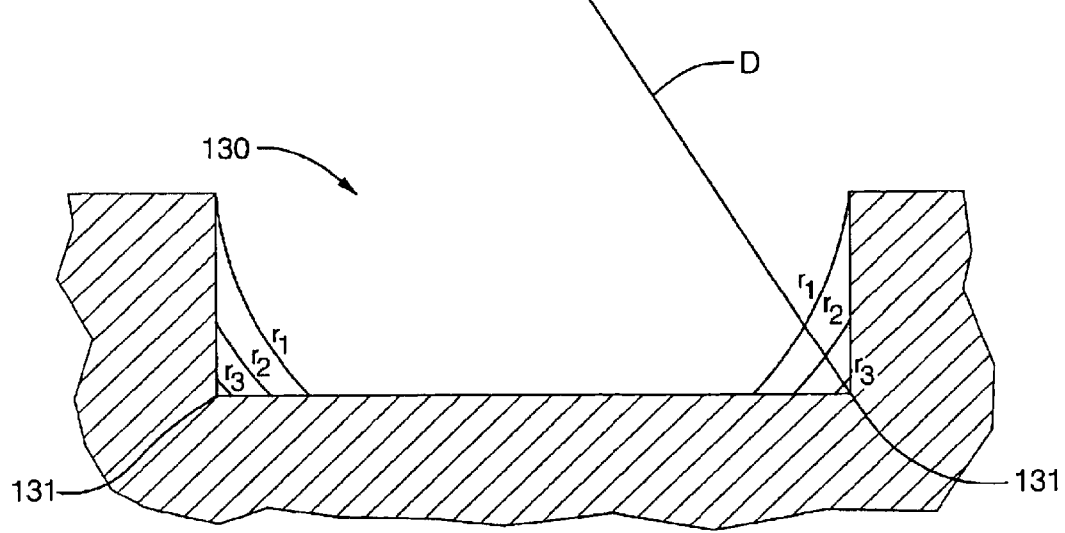
FIG. 7 is a partial diagrammatic view of a longitudinal slot within a ball nut.
Figure 8:
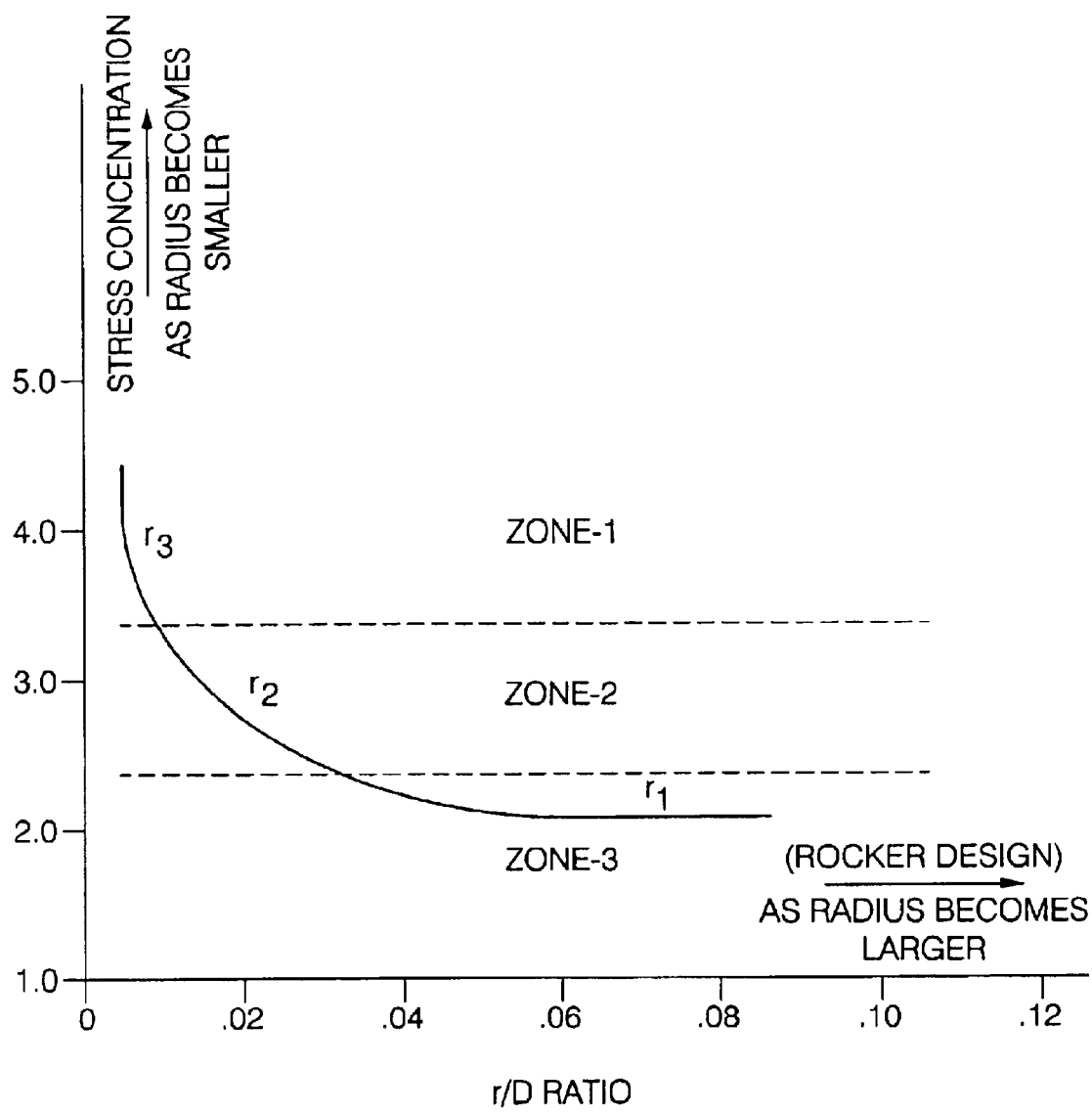
FIG. 8 is a graph of stress concentration factors versus the radius of curvature to diameter ratio; and, FIG. 9 is a partial end plan view of a return liner housed within a longitudinal slot of a ball nut.

The elimination of the sharp corners within the longitudinal slot 130 and corresponding return liner 150 provides several advantages. As shown in FIGS. 7 and 8, stress concentration comparisons display the reduction in stress concentration which is provided by the longitudinal slot 130 and return liner 150. FIG. 7 shows a longitudinal slot 130 with the otherwise perpendicular corners 131 replaced by curved walls having various radii of curvature $r_1$, $r_2$, and $r_3$ and D representing an internal diameter of the ball nut 100. In FIG. 8, the stress concentration factor, $K_{ts}$, in relation to the radii of curvature/D is compared. It can be seen that as the r/D ratio becomes larger, the stress decreases in quantity. By contrast, as the r/D ratio becomes smaller, the stress increases in quantity significantly. The stress concentration factor is smallest within zone 3 where $r_1/D$ is the largest, the stress concentration factor is at a medium level within zone 2 when $r_2/D$ is used, and the stress concentration factor is largest in zone 1 where $r_3/D$ is used. The wall having the $r_3$ radius of curvature, which is or nearly is 90 degrees, relates most closely to a traditional key slot having perpendicular corners and provides the highest level of stress concentration. The wall having the $r_1$ radius of curvature, relating most closely to the rocker return design of FIGS. 4-6, is shown to have the smallest level of stress concentration. Thus, the rocker return design of the longitudinal slot 130 and return liner 150 take advantage of a reduction in stress concentration. Additionally, a wider radius of curvature, such as in semicircular shapes and/or gothic arch design, provides improved curvature and minimizes the thermal distortion and stress elevation.

In addition to a reduction in stress concentration, the return liner 150 and corresponding longitudinal slot 130 allows the return system the ability to "float" in dual directions, as shown by double arrow 153 in FIG. 4, during ball transfer, something which is not possible with traditional key slots.

The return liner 150 and longitudinal slot 130 are preferably designed as a "rocker" with gothic arch curvature to move back and forth as well as having the capability to float in and out of two planes as needed. This also provides a minimum of freedom during the ball transfer within the ball nut assembly. A benefit of the return assembly is to prevent the sensitivity from accuracy impact of keyway, return hole or pocket due to its gothic arch construction, which is more forgiving. The two liner contacting points from the gothic arch are largely supported around 40 to 50 degree of key radius areas from the ball nut as previously described, thus the design is capable of swivel or rock as needed with limited freedom. Some of the inaccuracy in the prior art results from thermal distortion at the heat treatment cycle. The return design thus is provided with a minimum of freedom and movement while ball transfer is in operation, thus it does not require special precision tolerances to link other counterparts nor does there exist a need to solely rely on the tangential angle ball pick-up and return. This is due to the mission of the return liner 150 to "reroute" the ball track in order to complete the circuitry whether in tension or compression mode. In other words, this will allow mating components such as ball screw 16, ball nut 100, ball bearing 18 and ball selections to be in a relatively cost effective and productive position.

From a manufacturing perspective, the return liner 150 can be manufactured in molded plastics, invested castings or powdered metals and thus has great flexibility in producing the parts. The mating key way at the ball nut also can be machined at the green stage then two steps of heat treatment which offer a minimum impact from the thermal distortion. This gives a simpler manufacturing process, an effective production cycle rate time, a better throughput and reduction of WIP for component matching.

In the assembly of the return system, one extra step is required to assemble the return liner 150 onto the arbor, which is the supporting tube to bridge the balls and circuits prior to ball screw transfer, then the sub-assembly must be retransferred from the arbor to the ball screw of the rack. The effort of retransfer tooling and the cycle time is believed to be compensated by the benefits of the rocker return design.

Overall, the rocker return liner design features advantages of simple components, stress reduction, more efficient manufacturing processes, better throughput and reduction of inventory.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A return liner for insertion in a longitudinal slot within a ball nut, the return liner comprising:
    a first end and a second end, a length defined by a distance from the first end to the second end;
    a first side and a second side, a maximum width of the return liner defined by a distance from the first side to the second side;
    a first surface having a plurality of S-shaped return grooves defined thereon, the S-shaped return grooves extending from the first side to the second side;
    a second surface for fitting within a longitudinal slot within a ball nut, the second surface having a curved wall extending from the first end to the second end, wherein a cross-section of the second surface includes a curved and arcuate wall extending from the first side and a curved and arcuate wall extending from the second side and wherein the cross-section of the second surface defines a gothic arch.

2. A ball nut comprising:
    a tubular body having a longitudinal axis, the tubular body having an inner surface and an outer surface;
    a plurality of arcuate grooves defined on the inner surface;
    a longitudinal slot defined on the inner surface parallel to the longitudinal axis; interrupting the plurality of arcuate grooves, and forming a pocket for receiving a return liner;
    wherein the longitudinal slot includes arcuate walls extending along the inner surface of the tubular body along the longitudinal axis of the tubular body and wherein the longitudinal slot includes a surface defining a gothic arch.

3. A ball nut and return liner assembly comprising:
    a ball nut having
    a tubular body having a longitudinal axis, the tubular body having an inner surface and an outer surface;
    a plurality of arcuate grooves defined on the inner surface;
    a longitudinal slot defined on the inner surface parallel to the longitudinal axis, interrupting the plurality of arcuate grooves, and forming a pocket for receiving the return liner, the longitudinal slot having first curved walls; and,
    the return liner having
    a first surface having a plurality of S-shaped return grooves defined thereon, the S-shaped return grooves extending from the first side to the second side to cooperate with the plurality of arcuate grooves in the ball nut;
    a second surface for fitting within the longitudinal slot within the ball nut, the second surface having second curved walls; and wherein the return liner is partially rockable within the longitudinal slot.

4. The return liner of claim 3 wherein the return liner has a crescent-shaped cross-section.

5. The assembly of claim 3 wherein the second surface of the return liner has a semicircle arch cross-section.

6. The assembly of claim 5 wherein the longitudinal slot has a gothic arch cross-section.

7. The assembly of claim 3 wherein the longitudinal slot has a semi-circular cross-section.

8. The assembly of claim 3 wherein the second surface of the return liner has a gothic arch cross section.

9. The assembly of claim 3 wherein the first curved walls are non-planar and the second curved walls are non-planar.

10. The assembly of claim 3 wherein a cross-section of the return liner is limited in contact to a cross-section of the longitudinal slot at two points.

11. The assembly of claim 10 wherein the two points exist approximately 45 degrees from either side of a line dividing the longitudinal slot longitudinally in half.

12. The assembly of claim 3 wherein the return liner is unfixed within the longitudinal slot.

13. The assembly of claim 3 wherein the return liner is movable within the longitudinal slot +/−5 degrees from a midpoint of the longitudinal slot.

14. A ball nut and return liner assembly comprising:
    a ball nut having
    a tubular body having a longitudinal axis, the tubular body having an inner surface and an outer surface;
    a plurality of arcuate grooves defined on the inner surface;
    a longitudinal slot defined on the inner surface parallel to the longitudinal axis, interrupting the plurality of arcuate grooves, and forming a pocket for receiving the return liner; and, the return liner having a first surface having a plurality of S-shaped return grooves defined thereon, the S-shaped return grooves extending from the first side to the second side to cooperate with the plurality of arcuate grooves in the ball nut;

a second surface for fitting within the longitudinal slot within the ball nut;

wherein a cross section of the return liner is limited in contact to a cross section of the longitudinal slot at two points.

15. The assembly of claim 14 wherein the two points exist approximately 45 degrees from either side of a line dividing the longitudinal slot longitudinally in half.

16. A ball screw assembly comprising:

a ball screw having a helical groove;

a plurality of ball bearings, wherein said ball bearings travel within said helical groove;

a ball nut having a tubular body having a longitudinal axis, the tubular body having an inner surface and an outer surface;

a plurality of arcuate grooves defined on the inner surface;

a longitudinal slot defined on the inner surface parallel to the longitudinal axis, interrupting the plurality of arcuate grooves, and forming a pocket for receiving a return liner, the longitudinal slot having first curved walls; and, a return liner having a first side and a second side;

a first surface having a plurality of S-shaped return grooves defined thereon, the S-shaped return grooves extending from the first side to the second side; and, a second surface for fitting within the longitudinal slot within the ball nut, the second surface having second curved walls;

wherein the return liner is partially movable within the longitudinal slot in clockwise and counterclockwise directions.

17. The return liner of claim 16 wherein the cross-section of the second surface defines a semicircle.

18. The assembly of claim 16 further comprising:

a ball screw having a helical groove; and, a plurality of ball bearings, wherein said ball bearings travel within said helical groove, wherein the S-shaped return grooves cooperate with the plurality of arcuate grooves in the ball nut and the helical groove in the ball screw for completing a plurality of bearing race circuits inside the ball nut, wherein the S-shaped return grooves return ball bearings circulating within said bearing race circuits to a preceding segment of an arcuate groove.

19. The assembly of claim 18 wherein the return liner is movable within the longitudinal slot when the ball bearings circulate through the return liner.

20. The assembly of claim 16 wherein the return liner is movable within the longitudinal slot +/−5 degrees from a midpoint of the longitudinal slot.

21. The assembly of claim 16 wherein a maximum width of the return liner is defined by a distance from the first side to the second side and wherein a cross-section of the second surface includes a curved and arcuate wall extending from the first side and a curved and arcuate wall extending from the second side.

* * * * *